United States Patent
Pyun et al.

(10) Patent No.: US 9,291,997 B2
(45) Date of Patent: Mar. 22, 2016

(54) HIGH SPEED HOLOGRAM RECORDING APPARATUS AND METHOD

(71) Applicant: SAMSUNG ELECTRONICS CO., LTD., Gyeonggi-do (KR)

(72) Inventors: Kyoung-seok Pyun, Seoul (KR); Alexander Morozov, Moscow (RU); Chil-sung Choi, Suwon-si (KR); Ivan Bovsunovskiy, Moscow (RU); Vladislav Druzhin, Moscow (RU); Andrew Putilin, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 236 days.

(21) Appl. No.: 13/846,251

(22) Filed: Mar. 18, 2013

(65) Prior Publication Data
US 2013/0308170 A1    Nov. 21, 2013

(30) Foreign Application Priority Data

May 17, 2012  (RU) .............................. 2012120356 U
Sep. 5, 2012  (KR) ........................ 10-2012-0098480

(51) Int. Cl.
*G03H 1/02*  (2006.01)
*G03H 1/04*  (2006.01)
*G03H 1/08*  (2006.01)
*G03H 1/16*  (2006.01)
*G03H 1/26*  (2006.01)

(52) U.S. Cl.
CPC .............. *G03H 1/02* (2013.01); *G03H 1/0476* (2013.01); *G03H 1/0891* (2013.01); *G03H 1/16* (2013.01); *G03H 2001/0415* (2013.01); *G03H 2001/0482* (2013.01); *G03H 2001/2655* (2013.01)

(58) Field of Classification Search
CPC ......... G03H 1/0005; G03H 1/26; G03H 1/04; G03H 2223/23; G03H 1/30; G03H 2001/0212; G03H 2001/303
USPC ........... 359/1, 3, 10, 11, 12, 22, 30, 31, 35, 9, 359/21, 24, 25, 27, 28, 34
See application file for complete search history.

(56) References Cited

U.S. PATENT DOCUMENTS

| | | | |
|---|---|---|---|
| 6,166,835 A * | 12/2000 | Yang | ............................... 359/22 |
| 6,330,088 B1 | 12/2001 | Klug et al. | |
| 7,200,097 B2 * | 4/2007 | Meyrueis et al. | ............ 369/103 |
| 7,911,919 B2 | 3/2011 | Sugita et al. | |

(Continued)

FOREIGN PATENT DOCUMENTS

| | | |
|---|---|---|
| KR | 10-0466622 B1 | 1/2005 |
| KR | 1020130018473 A | 2/2013 |

(Continued)

*Primary Examiner* — Bumsuk Won
*Assistant Examiner* — Ephrem Mebrahtu
(74) *Attorney, Agent, or Firm* — Sughrue Mion, PLLC

(57) ABSTRACT

A high speed hologram recording apparatus and method. The hologram recording apparatus includes: a light source for emitting coherent light; a beam splitter for splitting the coherent light emitted from the light source into a signal beam and a reference beam; a signal beam transfer unit comprising an angular deflector that changes a direction of the signal beam according to time, and irradiating the signal beam onto a hologram recording medium; and a reference beam transfer unit irradiating the reference beam at a location of the hologram recording medium where the signal beam is also irradiated.

22 Claims, 6 Drawing Sheets

(56) References Cited

U.S. PATENT DOCUMENTS

| | | | |
|---|---|---|---|
| 2002/0145773 A1* | 10/2002 | Tanaka et al. | 359/7 |
| 2002/0154589 A1* | 10/2002 | Tanaka et al. | 369/103 |
| 2004/0012833 A1* | 1/2004 | Newswanger et al. | 359/35 |
| 2007/0019266 A1 | 1/2007 | Kihara et al. | |
| 2007/0146838 A1 | 6/2007 | Toishi et al. | |
| 2008/0186830 A1* | 8/2008 | Fukuda | 369/103 |
| 2008/0239427 A1* | 10/2008 | Okada et al. | 359/22 |
| 2010/0027086 A1 | 2/2010 | Sato et al. | |
| 2011/0013156 A1* | 1/2011 | Kawano et al. | 355/2 |
| 2011/0228040 A1 | 9/2011 | Blanche et al. | |

FOREIGN PATENT DOCUMENTS

| | | |
|---|---|---|
| KR | 1020130037159 A | 4/2013 |
| KR | 1020140027813 A | 3/2014 |
| RU | 2011133280 A | 2/2013 |

* cited by examiner

HIGH SPEED HOLOGRAM RECORDING APPARATUS AND METHOD

CROSS-REFERENCE TO RELATED APPLICATIONS

This application claims priority from Russian Patent Application No. 2012-120356, filed on May 17, 2012, in the Russian Intellectual Property Office, and Korean Patent Application No. 10-2012-0098480, filed on Sep. 5, 2012, in the Korean Intellectual Property Office, the disclosures of which are incorporated herein in their entirety by reference.

BACKGROUND

1. Field

Apparatuses and methods consistent with exemplary embodiments relate to apparatuses for and methods of recording holograms, and more particularly, to apparatuses for and methods of recording holograms at high speed by simultaneously recording a plurality of hogels.

2. Description of the Related Art

Hologram technology is used for reproducing a signal as a three-dimensional (3D) image by recording interference fringes between a signal beam carrying the signal and a reference beam. Such hologram technology may be variously used for recording and reproducing 3D images, preventing forging of and identifying genuine goods, and recording and reproducing digital data. Also, this technology may be used to record fine interference fringes on a photosensitive recording film of a flat plate type in a pixel (or hologram pixel, i.e., hogel) unit so as to allow a user to see 3D images on a two-dimensional (2D) plane.

Holograms may be classified into rear projective holograms and reflective holograms. A rear projective hologram is one where light transmitting through a recording film carries 3D images, and a reflective hologram is one where light reflected from a recording film carries 3D images. In particular, the reflective hologram may be used to record/reproduce frill-color and full-parallax images, and may represent gray scales.

A hologram may be generally recorded by splitting a beam emitted from a light source into a signal beam and a reference beam, optically modulating the signal beam, and irradiating the signal beam and the reference beam to the same location on a photosensitive recording film. The modulation of the signal beam may be performed by, for example, a spatial optical modulator according to an interference pattern that is calculated by a computer based on an image that will be finally reproduced from the photosensitive recording film.

For high speed hologram recording, it is very important to simultaneously record hogels that are basic units of the hologram. In general, a plurality of optical elements may be provided to overlap with each other to record the hogels at the same time. However, this may increase the costs for manufacturing a hologram recording apparatus, and there may be a spatial limitation in installing the hologram recording apparatus.

SUMMARY

Provided are apparatuses for and methods of recording hologram at high speed by recording a plurality of hogels nearly at the same time.

Additional aspects will be set forth in part in the description which follows and, in part, will be apparent from the description, or may be learned by practice of the presented exemplary embodiments.

According to an aspect of an exemplary embodiment, a hologram recording apparatus comprises: a light source which emits a coherent light; a beam splitter which splits the coherent light emitted from the light source into a signal beam and a reference beam; a signal beam transfer unit comprising an angular deflector that changes a direction of the signal beam according to time, and said signal beam transfer unit irradiating the signal beam onto a hologram recording medium; and a reference beam transfer unit irradiating the reference beam to a location of the hologram recording medium where the signal beam is also irradiated.

The signal beam transfer unit may comprise: a beam expander expanding a beam diameter of the signal beam transmitted from the beam splitter and providing an expanded signal beam to the angular deflector; a spatial light modulator (SLM) modulating the signal beam according to hogel information, a proceeding direction of the signal beam being deflected by the angular deflector; and a Fourier-transformation optical system which Fourier transforms the modulated signal beam to focus the signal on the hologram recording medium, and said Fourier-transformation system comprising at least one Fourier-transformation device.

The signal beam transfer unit may further comprise a phase mask which adjusts a shape and a size of the signal beam and makes an intensity of the signal beam consistent per unit area.

The phase mask may be disposed between the SLM and the Fourier-transformation optical system. The signal beam transfer unit may further include a first Fourier-transformation device disposed between the SLM and the phase mask for condensing the signal beam incident onto the phase mask.

The reference beam transfer unit may comprise: at least one mirror which adjusts a path of the reference beam; a relay system which adjusts a beam diameter of the reference beam; and a deflector which adjusts an incident location and an incident angle of the reference beam that is incident onto the hologram recording medium.

The hologram recording apparatus may further include a location setting device for moving the hologram recording medium according to a recording location on the hologram recording medium.

The hologram recording apparatus may further comprise a controller configured to synchronize the light source, the angular deflector, the SLM, the deflector, and the location setting device with each other.

The reference beam transfer unit may be configured so that the reference beam has a cross-sectional area that is the same as a cross-sectional area of the signal beam on the hologram recording medium.

The SLM relates to a transmission type.

A period of time for changing the direction of the signal beam by using the angular deflector may be less than a period of time for moving the hologram recording medium by using the location setting device.

According to another aspect of an exemplary embodiment, a hologram recording system comprises: the hologram recording apparatus described above; and the hologram recording medium.

The hologram recording medium may include: a recording layer formed of a photosensitive material; and a protective layer coated on a surface of the recording layer for protecting the recording layer.

According to another aspect of an exemplary embodiment, there is provided a hologram recording method comprising: recording a first hogel by deflecting a signal beam, modulating the signal beam according to information about the first hogel, and irradiating the signal beam onto a hologram recording medium; and recording a second hogel by deflecting the signal beam in another direction, loading information about the second hogel in the signal beam, and irradiating the signal beam onto the hologram recording medium, wherein the recording of the first hogel and the second hogel may be performed when the hologram recording medium is fixed.

The deflected direction of the signal beam may be set so that the first and second hogels are adjacent to each other.

According to another aspect of an exemplary embodiment, there is provided a hologram recording method comprising: splitting light into a signal beam and a reference beam; deflecting the signal beam in a plurality of directions according to time modulating signal beams deflected in the plurality of directions according to information about hogels; recording a plurality of hogels by irradiating the modulated signal beams and the reference beam onto a hologram recording medium.

The recording of the plurality of hogels may be performed when the hologram recording medium is fixed.

The hologram recording method may further include moving and stabilizing the hologram recording medium after the recording of the plurality of hogels. The hologram recording method may further include repeatedly performing the splitting, the deflecting, the modulating, and the recording operations after the moving of the hologram recording medium. The operations may be repeated until a number of deflected directions of the signal beam reaches a predetermined number.

A period of time for deflecting the signal beam in another direction may be less than a period of time for moving the hologram recording medium.

The beam splitter may comprise a semi-transmittive mirror.

BRIEF DESCRIPTION OF THE DRAWINGS

These and/or other aspects will become apparent and more readily appreciated from the following description of the exemplary embodiments, taken in conjunction with the accompanying drawings of which.

DETAILED DESCRIPTION

Figure 1:
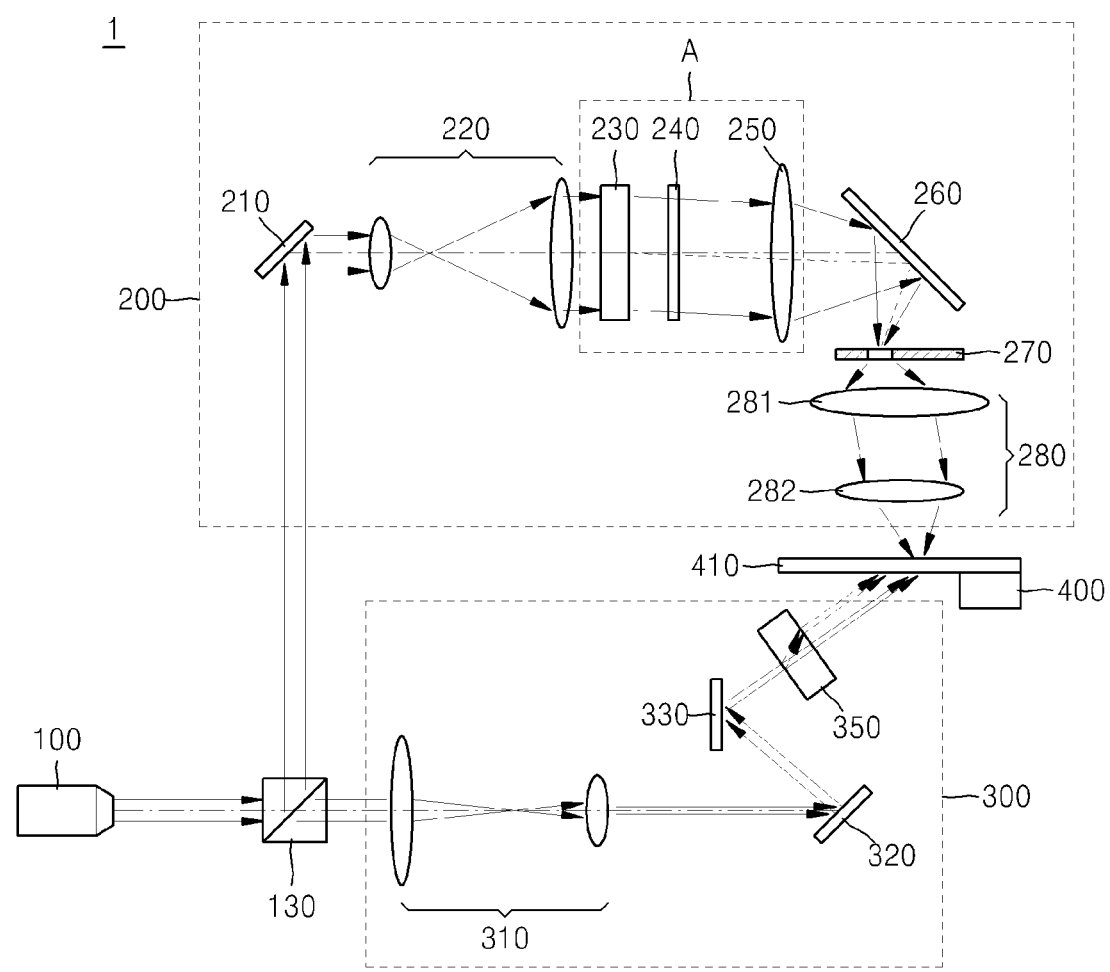
FIG. 1 is a diagram schematically showing a high speed hologram recording apparatus according to an exemplary embodiment.

Exemplary embodiments will now be described more fully with reference to the accompanying drawings. In the drawings, the thicknesses of layers and regions are exaggerated for clarity. Like reference numerals in the drawings denote like elements, and thus their description will be omitted.

The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art.

FIG. 1 is a diagram schematically showing a structure of a high speed hologram recording apparatus according to an exemplary embodiment.

A hologram is recorded generally by splitting a light beam emitted from a light source into a signal beam and a reference beam, optically modulating the signal beam, and irradiating the signal beam and the reference beam to the same location on a hologram recording medium, for example, a photosensitive recording film, to record interference fringes. The signal beam may be modulated by a spatial light modulator (SLM) according to an interference pattern that is calculated by a computer based on an image that will be finally reproduced from the photosensitive recording film.

Also, in order to improve a hologram resolution while recording a wide area hologram, the hologram may be recorded in units of hogels, a hogel being a basic unit of the hologram and having, for example, a width of a few hundreds of μm.

In general, in order to record a first hogel from among a plurality of hogels, information about the first hogel is input to the SLM, and an interference fringe of the signal beam modulated according to the first hogel and the reference beam is recorded.

In order to record a second hogel, the following steps are performed. First, the hologram recording medium has to be moved to a location in order to record information about a next hogel. Then, information about the second hogel is input to the SLM and a laser beam is irradiated so that an interference fringe of the signal beam modulated according to the second hogel and the reference beam is recorded.

As described above, the above described processes are generally repeated in order to record a plurality of hogels. However, it takes a predetermined time for stabilizing the apparatus, that is, it takes time to move the hologram recording medium and also to reduce vibrations caused by this movement, in order to record a new hogel after moving the hologram recording medium. Therefore, in order to record one hogel, in addition to the time taken to record the hogel, it also takes time to move and stabilize the hologram recording medium, and thus, the overall processes to record a plurality of hogels increase.

Exemplary embodiments relate to a high speed hologram recording apparatuses and methods.

Referring to FIG. 1, the hologram recording apparatus 1 according to the present exemplary embodiment includes a light source 100 emitting a coherent ray that may be optically time modulated, a beam splitter 130 splitting the ray emitted from the light source 100 into a signal beam and a reference beam, a signal beam transfer unit 200 including an angular deflector 230 changing a direction of the signal beam according to time and irradiating the signal beam to the hologram recording medium 410, and a reference beam transfer unit 300 irradiating the reference beam to a location where the signal beam is also irradiated to the hologram recording medium 410. Also, the hologram recording apparatus 1 may further include a location setting device 400 for moving the hologram recording medium 410 according to a recording location thereon where an image will be recorded.

The light source 100 may include a laser that may emit a coherent ray. Also, the light source 100 may further include additional devices for adjusting an intensity of an output light according to time or adjusting a wavelength or a period of the output light.

The beam splitter 130 may be, for example, a semi-transmittive mirror. In this case, the beam splitter 130 reflects about 50% of incident light to the signal beam transfer unit 200, and transmits about 50% of the incident light to the reference beam transfer unit 300. However, this is just an example, and a splitting ratio of incident light may vary. Although it is described that the light reflected from the beam splitter 130 is the signal beam and the light transmitting through the beam splitter 130 is the reference beam in FIG. 1, FIG. 1 is just an example. For example, in another exemplary embodiment, the hologram recording apparatus 1 may be configured so that the light reflected by the beam splitter 130 may be the reference beam and the light transmitting through the beam splitter 130 may be the signal beam. Also, in another exemplary embodiment, the beam splitter 130 may be a polarization beam splitter reflecting or transmitting the incident light according to a polarization direction thereof.

The signal beam transfer unit 200 transfers the signal beam carrying hogel information and divided by the beam splitter 130 to the hologram recording medium 410. The signal beam transfer unit 200 includes the angular deflector 230 that changes a direction of the signal beam according to time. Also, the signal beam transfer unit 200 includes a beam expander 220 that expands a beam diameter of the signal beam transferred from the beam splitter 130 and provides the angular deflector 230 with the expanded signal beam, an SLM 240 modulating the signal beam, a proceeding direction of which is polarized by the angular deflector 230 to carry the hogel information, and a Fourier-transformation optical system 280 for Fourier-transforming the modulated signal beam and focusing the modulated signal beam on the hologram recording medium 410. In addition, the signal beam transfer unit 200 may further include one or more mirrors 210 and 260 that may adjust a path of the signal beam.

The beam expander 220 may expand the signal beam, for example, to correspond to an effective optical modulation region of the angular deflector 230 and the SLM 240, and may consist of a plurality of optical devices including a refractive lens.

The angular deflector 230 changes the direction of the signal beam transferred from the beam expander 220 according to time to adjust the direction of the signal beam incident to the SLM 240. The angular deflector 230 may deflect the signal beam by an angle that is calculated in advance in order to record the hogel at an appropriate location. The deflection angle of the signal beam may be, for example, a few degrees (°). In addition, the angular deflector 230 may maintain the deflected signal beam for a predetermined time period, and then, deflects the signal beam by another next angle that is determined in advance after a predetermined time has passed. The angular deflector 230 may be a mechanical angular deflector, an acoustic angular deflector, or an electric angular deflector, but the present invention is not limited to the above examples.

The SLM 240 modulates the signal beam according to an interference pattern calculated by a computer based on an image or information that will be finally reproduced. That is, the SLM 240 modulates the signal beam according to the information about the hogels. According to an exemplary embodiment, the SLM 240 is of a transmission type; however, the SLM 240 may be of a reflective type. In the latter case, additional optical devices may be necessary.

The Fourier-transformation optical system 280 focuses the modulated signal beam on the hologram recording medium 410, and may include at least one Fourier-transform device. In FIG. 1, a second Fourier-transformation device 281 and a third Fourier-transformation device 282 form the Fourier-transformation optical system 280; however, the Fourier-transformation optical system 280 may include one Fourier-transformation device, a plurality of Fourier-transformation devices, and/or various optical devices.

In FIG. 1, the first Fourier-transformation device 250 initially condenses the modulated signal beam transferred from the SLM 240; however, the first Fourier-transformation device 250 may be disposed to directly focus the modulated signal beam onto the hologram recording medium 410.

Figure 2A:
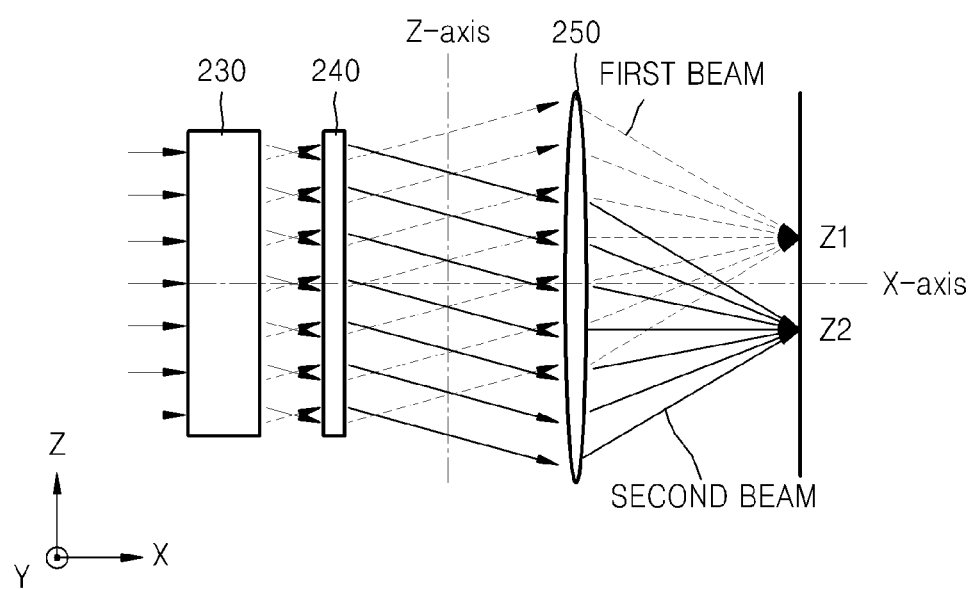
FIG. 2A is a diagram showing an example of a portion A of FIG. 1.

FIG. 2A is a diagram showing in detail an example of portion A shown in FIG. 1. The portion A of FIG. 1 contains the angular deflector 230, the SLM 240, and the first Fourier-transformation device 250.

In FIG. 2A, a proceeding direction of the signal beam is an X-axis direction, and a direction perpendicular to the X-axis direction is a Z-axis direction. Referring to FIG. 2A, the angular deflector 230 may be set to change the signal beam in two directions along the Z-axis direction according to the exemplary embodiment. The angular deflector 230 sequentially changes the direction of the signal beam within a very short period of time, and does not divide the signal beam into two beams simultaneously.

If it is assumed that the signal beams, directions of which are changed by the angular deflector 230, are a first beam and a second beam respectively, the first beam is modulated while passing through the SLM 240 to carry information about one hogel, and then, is condensed on a location Z1 after transmitting through the first Fourier-transformation device 250. After that, the condensed first beam is transferred to the hologram recording medium 410, and forms an interference fringe with the reference beam provided by the reference beam transfer unit 300 to record the hogel on the hologram recording medium 410.

After finishing the recording of the hogel by the first beam, the angular deflector converts the signal beam into the second beam. The second beam provided by the angular deflector 230 is modulated when transmitting through the SLM 240 to carry information about another hogel, and then is condensed on a location Z2 that is different from the location where the first beam is condensed after transmitting through the first Fourier-transformation device 250. After that, the condensed second beam is transferred to the hologram recording medium 410, and forms an interference fringe with the reference beam provided from the reference beam transfer unit 30 to record the other hogel on the hologram recording medium 410. The deflected directions of the first beam and the second beam may be the directions calculated in order to record adjacent hogels.

The number of directions into which the signal beam may be deflected by the angular deflector 230 is not limited to two, and may be variously set. For example, the angular deflector 230 may deflect the signal beam in tens to hundreds of directions.

Figure 2B:
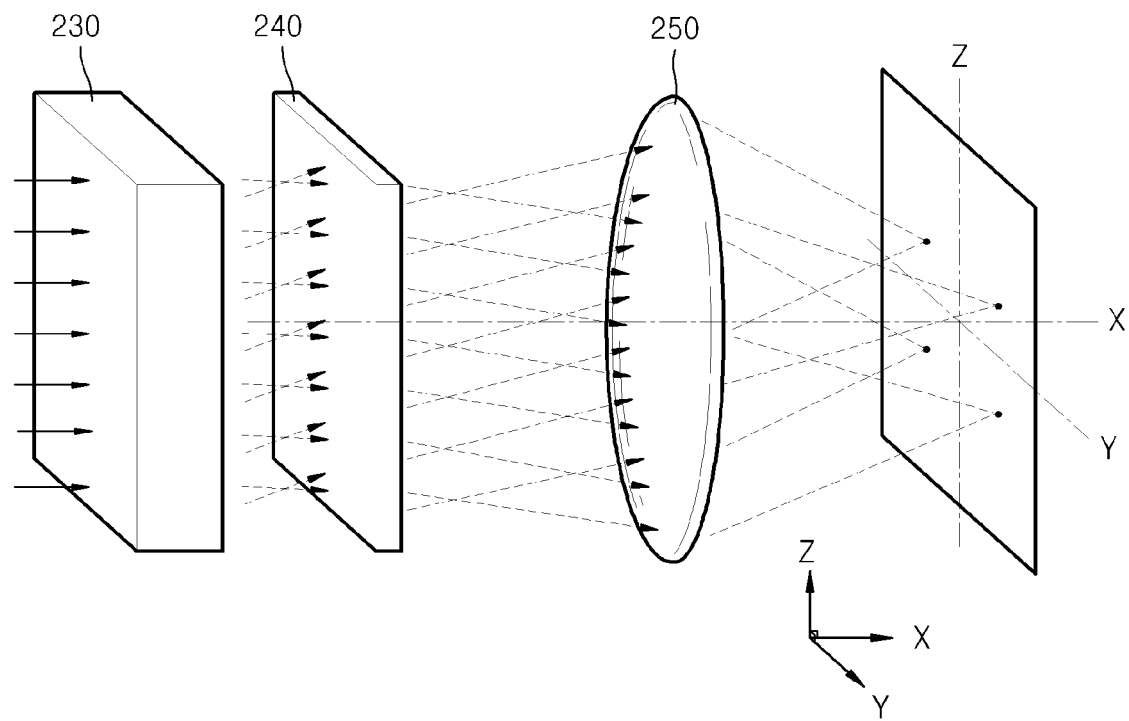
FIG. 2B is a diagram showing another example of the portion A of FIG. 1.

FIG. 2B is a diagram illustrating another example of the portion A shown in FIG. 1.

Referring to FIG. 2B, the angular deflector 230 may change the direction of the signal beam in the Z-axis and Y-axis directions. When the direction is changed in two directions with respect to each of the Z-axis and the Y-axis by the angular deflector 230, deflected beams in four directions are obtained. The directions of the deflected beams may be calculated in order to record adjacent hogels.

According to another exemplary embodiment, the number of directions into which the signal beam may be deflected by the angular deflector 230 may be equal to N (N is a natural number) for each of the Z-axis and the Y-axis. Thus, the total number of directions into which the signal beam may be deflected is N2, and accordingly, a first beam through an N2-th beam are formed.

A time period for maintaining the first beam may vary according to a time taken to record the hogel on the hologram recording medium 410. The time required to record the hogel may vary according to an exposure energy required by the hologram recording medium 410 and may vary according to an intensity of the light from the light source 100 and an energy transfer efficiency of the hologram recording apparatus 1. The time required to record one hogel may be, for example, a few to tens of micro-seconds (μs).

After the time period for recording one hogel by using the first beam has passed, the angular deflector 230 generates the second beam. A time taken to change the first beam to the second beam may be much shorter than that for maintaining the first beam and the second beam.

As described above, the angular deflector 230 sequentially performs the operation of generating a next deflected signal beam when the recording of the hogel is finished by using one deflected signal beam, until the deflected signal beams in the predetermined number are generated. For example, the angular deflector 230 may generates the $N^2$ deflected signals beams.

Meanwhile, when finishing the recording of the hogels by using all of the signal beams deflected by the angular deflector 230, the hologram recording medium 410 is moved by the location setting device 400 to prepare for recording of other hogels. Since the location setting device 400 mechanically moves the hologram recording medium 410, vibrations may be generated when the hologram recording medium 410 is moved. Therefore, a time for stabilizing the system, that is, a time taken to move the hologram recording medium 410 and until the vibrations disappear, is necessary in order to record other hogels. A time taken to move the hologram recording medium 410 and to stabilize the system may be, for example, a few to a few tens of ms.

Therefore, the time period for deflecting and maintaining the signal beam by using the angular deflector 230 may be much shorter than the time period for moving and stabilizing the hologram recording medium 410.

Figure 3A:
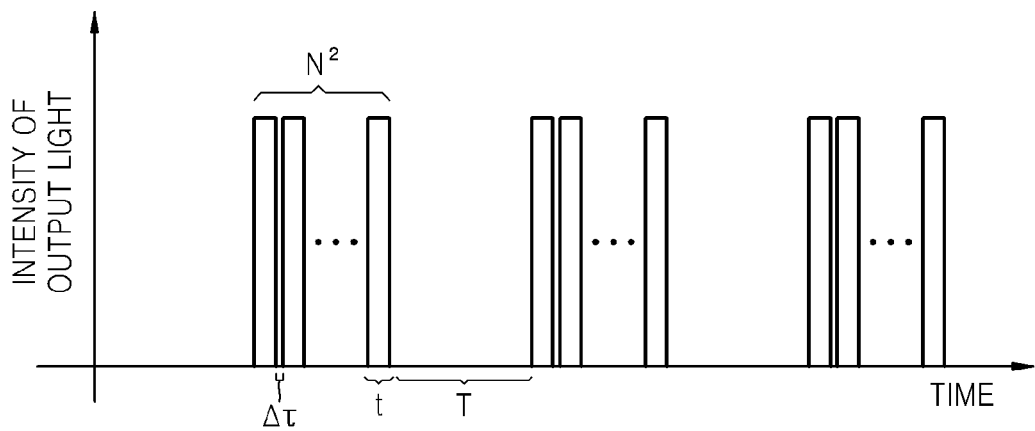
FIG. 3A is a graph showing an intensity of a light source according to time, according to an exemplary embodiment.

FIG. 3A is a graph showing an intensity of the light source 100 according to time, according to an exemplary embodiment.

The light source 100 emits the light for recording the hogels as pulse waves.

Referring to FIG. 3A, t denotes a time taken to record one hogel. That is, a direction of the beam emitted from the angular deflector 230 is maintained constantly for the time period t, during which the hogel is recorded. When recording the hogel, the angular deflector 230 deflects the signal beam for recording another hogel. In this case, Δτ denotes a time taken by the angular deflector 230 to deflect the signal beam deflected in one direction in another direction.

Meanwhile, in FIG. 3A, ΔT denotes a time period for moving and stabilizing the hologram recording medium 410. The period Δτ may be much shorter than the period ΔT. Therefore, when the hogels are recorded while adjusting the direction of the signal beam by using the angular deflector 230, many hogels may be recorded within a short period of time.

When the angular deflector 230 deflects the signal beam in N directions along the Z-axis and Y-axis, $N^2$ beams are emitted from the angular deflector 230, and the light source 100 emits $N^2$ pulses. That is, $N^2$ hogels are recorded without moving the hologram recording medium 410.

Figure 3B:
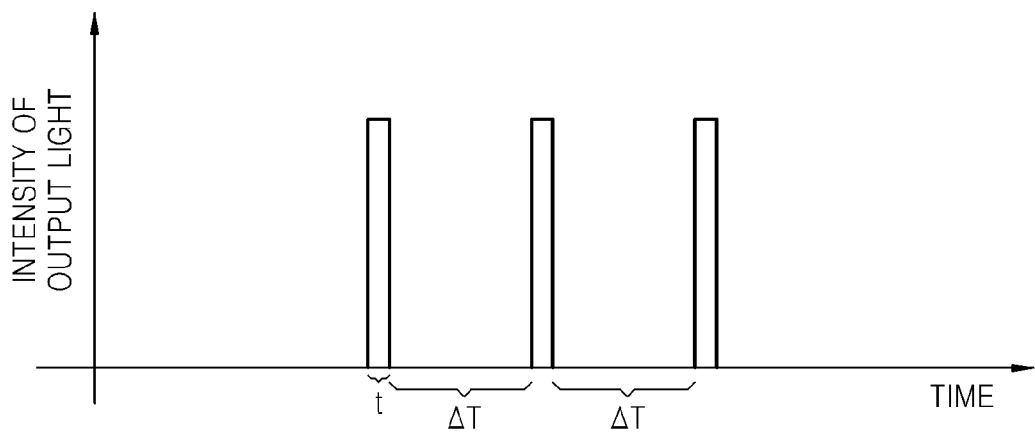
FIG. 3B is a graph showing an intensity of a light source driven to record a hologram when there is no angular shifter.

FIG. 3B is a graph showing an intensity of the light source 100 driven to record the hologram according to time, when no angular deflector 230 is used.

Referring to FIG. 3B, when no angular deflector 230 is used, the hologram recording medium 410 has to be moved whenever a hogel is recorded, and thus, it takes much more time to record the hogels than in the case where the angular deflector 230 is used.

Figure 4:
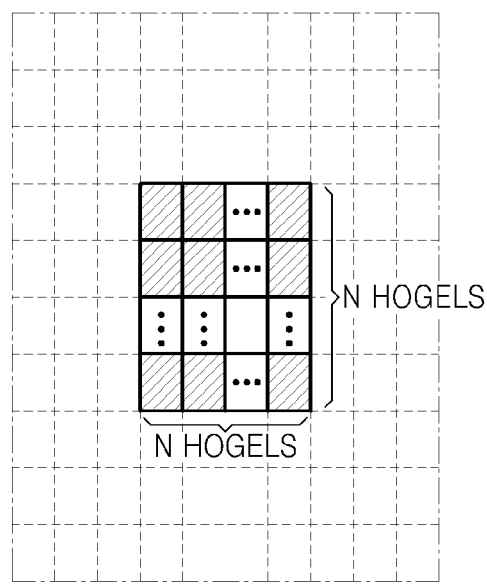
FIG. 4 is a diagram showing recording of a hogel on a hologram recording medium before moving the hologram recording medium, according to an exemplary embodiment.

FIG. 4 shows a shape of hogels recorded on the hologram recording medium 410 before moving the hologram recording medium 410, according to an exemplary embodiment. In FIG. 4, if the number of deflected directions by the angular deflector 230 is $N^2$, $N^2$ hogels are simultaneously recorded on the hologram recording medium 410 without mechanically moving the hologram recording medium 410.

Meanwhile, the hologram recording medium 410 generally includes a recording layer formed of a photosensitive material and a protective layer coated on the recording layer for protecting the recording layer. The intensity of the light source 100 and the exposure time may vary according to characteristics of the hologram recording medium 410. That is, if the hologram recording medium 410 is formed of a material that is highly photosensitive, the intensity of the light source 100 and/or the exposure time may be reduced.

Referring back to FIG. 1, the signal beam transfer unit 200 may further include a phase mask 270 that changes a shape of the condensed signal beam to a desired shape and also changes the signal beam to have a consistent intensity in front of the Fourier-transformation optical system 280. The phase mask 270 may change the shape of the signal beam, for example, from a circular shape to a square shape. In this case, the hogel has a square shape, and thus, a gap between two hogels may be reduced.

The reference beam transfer unit 300 transfers the reference beam that is splitted by the beam splitter 130 to the hologram recording medium 410. The signal beam carrying the hogel information and the reference beam are transferred to the hologram recording medium 410 from the signal beam transfer unit 200 and the reference beam transfer unit 300, and then, the signal beam and the reference beam interfere with each other in the hologram recording medium 410. In this case, the interference fringes generated when the signal beam and the reference beam interfere with each other are recorded in the hologram recording medium 410.

To do this, the reference beam transfer unit 300 may be configured so that the reference beam may be incident at the same location on the hologram recording medium 410 with the signal beam. Also, the reference beam transfer unit 300 may be configured so that a cross-sectional area of the reference beam and a cross-sectional area of the signal beam match with each other on the hologram recording medium 410.

Referring to FIG. 1, the reference beam transfer unit 300 includes at least one mirror 320 for transferring the reference beam to the hologram recording medium 410, and may also include a deflector 350 that may finely adjust the reference beam so that the reference beam may be incident at a desired location and at a desired angle on the hologram recording medium 410. Also, the reference beam transfer unit 300 may further include a relay system 310 that adjusts a beam diameter of the reference beam.

The deflector 350 of the reference beam transfer unit 300, in conjunction with the angular deflector 230, adjusts the contact location of the reference beam on the hologram recording medium 410 so that the signal beam deflected by the angular deflector 230 and the reference beam may be incident at the same location on the hologram recording medium 410.

Meanwhile, the hologram recording apparatus 1 of the present exemplary embodiment may also include an electronic and electric control unit (not shown) that may temporarily and spatially synchronize the light source 100, the angular deflector 230, the SLM 240, the deflector 350, and the location setting device 400 with each other.

Figure 5:
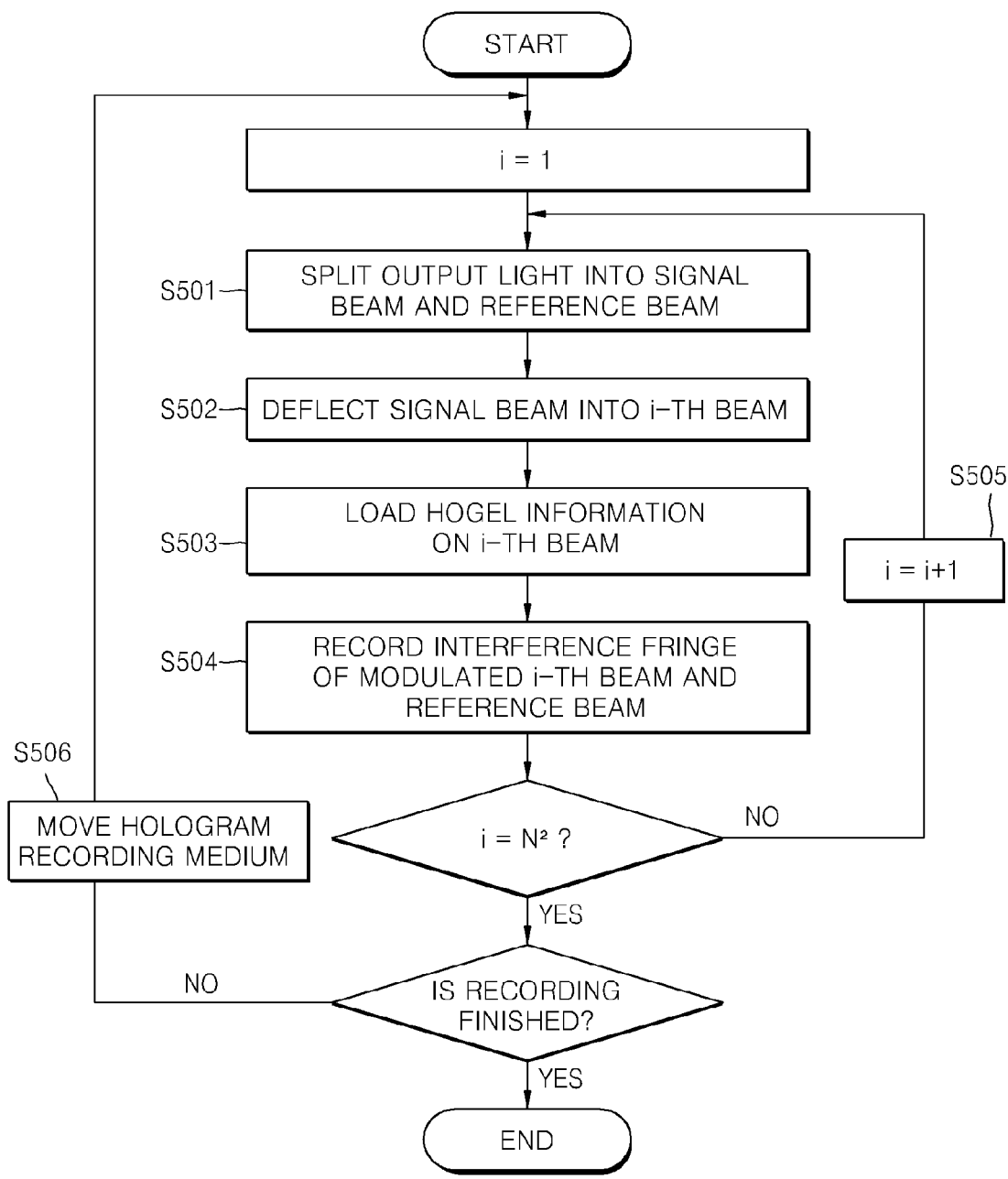
FIG. 5 is a flowchart illustrating a high speed hologram recording method according to an exemplary embodiment.

FIG. 5 is a flowchart illustrating a method of recording a hologram at high speed according to an exemplary embodiment.

Referring to FIG. 5, the high speed hologram recording method includes splitting coherent output light into a signal beam and a reference beam (S501), deflecting the signal beam in a predetermined direction (S502), modulating the deflected signal beam according to hogel information (S503), recording hogels by irradiating the modulated signal beam and the reference beam at the same location on a hologram recording medium (S504), and repeatedly performing the operations of S501 through S504 until the number of deflected directions of the signal beam has reached a predetermined number (S505).

Also, the hologram recording method may further include moving and stabilizing the hologram recording medium 410 (S506) after the operation S505, and the operation of S505 may be performed after the operation S506. The operations S505 and S506 may be repeatedly performed until the recording on the hologram recording medium is finished.

According to the hologram recording apparatus, a hologram may be recorded at high speed since a plurality of hogels may be recorded nearly at the same time. Also, less optical elements than in the conventional art are used, and thus, the manufacturing costs of the high speed hologram recording apparatus may be reduced.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A hologram recording apparatus comprising:
   a light source which emits a coherent light;
   a beam splitter which splits the light emitted from the light source into a signal beam and a reference beam;
   a signal beam transfer unit comprising an angular deflector that changes a direction of the signal beam according to a time period elapsed between recordings, and said signal beam transfer unit irradiating the signal beam onto a hologram recording medium; and
   a reference beam transfer unit irradiating the reference beam to a location of the hologram recording medium where the signal beam is also irradiated.

2. The hologram recording apparatus of claim 1, wherein the signal beam transfer unit comprises:
   a beam expander expanding a beam diameter of the signal beam transmitted from the beam splitter and providing an expanded signal beam to the angular deflector;
   a spatial light modulator (SLM) modulating the signal beam according to hogel information, a proceeding direction of the signal beam being deflected by the angular deflector; and
   a Fourier-transformation optical system which Fourier-transforms the modulated signal beam to focus the signal on the hologram recording medium, and said Fourier-transformation optical system comprising at least one Fourier-transformation device.

3. The hologram recording apparatus of claim 2, wherein the signal beam transfer unit further comprises a phase mask which adjusts a shape and a size of the signal beam and makes an intensity of the signal beam consistent per unit area.

4. The hologram recording apparatus of claim 3, wherein the phase mask is disposed between the SLM and the Fourier-transformation optical system, the beam expander being separate from the Fourier-transformation optical system.

5. The hologram recording apparatus of claim 4, wherein the signal beam transfer unit further comprises a first Fourier-transformation device disposed between the SLM and the phase mask for condensing the signal beam incident onto the phase mask.

6. The hologram recording apparatus of claim 5, wherein the reference beam transfer unit comprises:
   at least one mirror which adjusts a path of the reference beam;
   a relay system which adjusts a beam diameter of the reference beam; and
   a deflector which adjusts an incident location and an incident angle of the reference beam that is incident onto the hologram recording medium.

7. The hologram recording apparatus of claim 6, further comprising a location setting device for moving the hologram recording medium according to a recording location on the hologram recording medium.

8. The hologram recording apparatus of claim 7, further comprising a controller configured to synchronize the light source, the angular deflector, the SLM, the deflector, and the location setting device with each other.

9. The hologram recording apparatus of claim 8, wherein the reference beam transfer unit is configured so that the reference beam has a cross-sectional area that is a same as a cross-sectional area of the signal beam on the hologram recording medium.

10. The hologram recording apparatus of claim 8, wherein the SLM relates to a transmission type.

11. The hologram recording apparatus of claim 8, wherein a period of time for changing the direction of the signal beam by using the angular deflector is less than a period of time for moving the hologram recording medium by using the location setting device.

12. A hologram recording system comprising:
   the hologram recording apparatus of claim 8; and
   the hologram recording medium.

13. The hologram recording system of claim 12, wherein the hologram recording medium comprises:
   a recording layer formed of a photosensitive material; and
   a protective layer coated on a surface of the recording layer for protecting the recording layer.

14. A hologram recording method comprising:
   recording a first hogel by deflecting a signal beam, modulating the signal beam according to information about the first hogel, and irradiating the signal beam onto a hologram recording medium; and
   recording a second hogel by deflecting the signal beam in another direction, loading information about the second hogel in the signal beam, and irradiating the signal beam onto the hologram recording medium,
   wherein the recording of the first hogel and the second hogel is performed when the hologram recording medium is fixed at a same location during both recordings.

15. The hologram recording method of claim 14, wherein the deflected direction of the signal beam is set so that the first and second hogels are adjacent to each other.

16. A hologram recording method comprising:
splitting light into a signal beam and a reference beam;
deflecting the signal beam in a plurality of directions according to a time period elapsed between recordings;
modulating signal beams deflected in the plurality of directions according to information about hogels;
recording a plurality of hogels by irradiating the modulated signal beams and the reference beam onto a hologram recording medium.

17. The hologram recording method of claim 16, wherein the recording of the plurality of hogels is performed when the hologram recording medium is fixed.

18. The hologram recording method of claim 16, further comprising moving and stabilizing the hologram recording medium after the recording of the plurality of hogels.

19. The hologram recording method of claim 18, further comprising repeatedly performing the splitting, the deflecting, the modulating, and the recording operations after the moving of the hologram recording medium.

20. The hologram recording method of claim 18, wherein a period of time for deflecting the signal beam in another direction is less than a period of time for moving the hologram recording medium.

21. The hologram recording apparatus of claim 1, wherein the beam splitter comprises a semi-transmittive mirror.

22. The hologram recording method of claim 19, wherein the operations are repeated until a number of deflected directions of the signal beam reaches a predetermined number.

* * * * *